No. 829,549. PATENTED AUG. 28, 1906.
G. SPARKS.
HYDRAULIC CLUTCH.
APPLICATION FILED JAN. 3, 1906.

6 SHEETS—SHEET 1.

Witnesses:

Inventor:
George Sparks,
By Wm. E. ——
Attorney

No. 829,549. PATENTED AUG. 28, 1906.
G. SPARKS.
HYDRAULIC CLUTCH.
APPLICATION FILED JAN. 3, 1906.
6 SHEETS—SHEET 2.
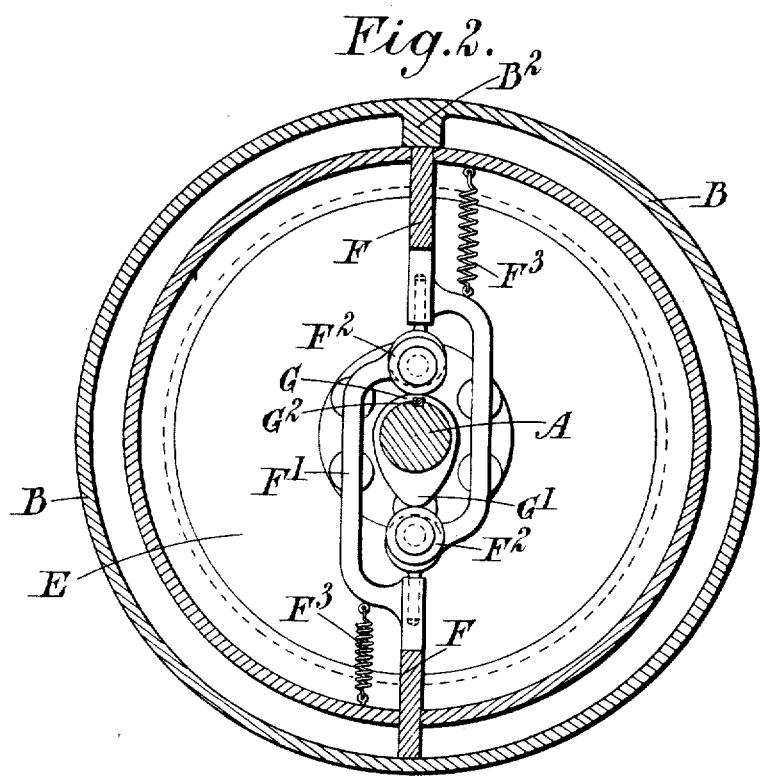

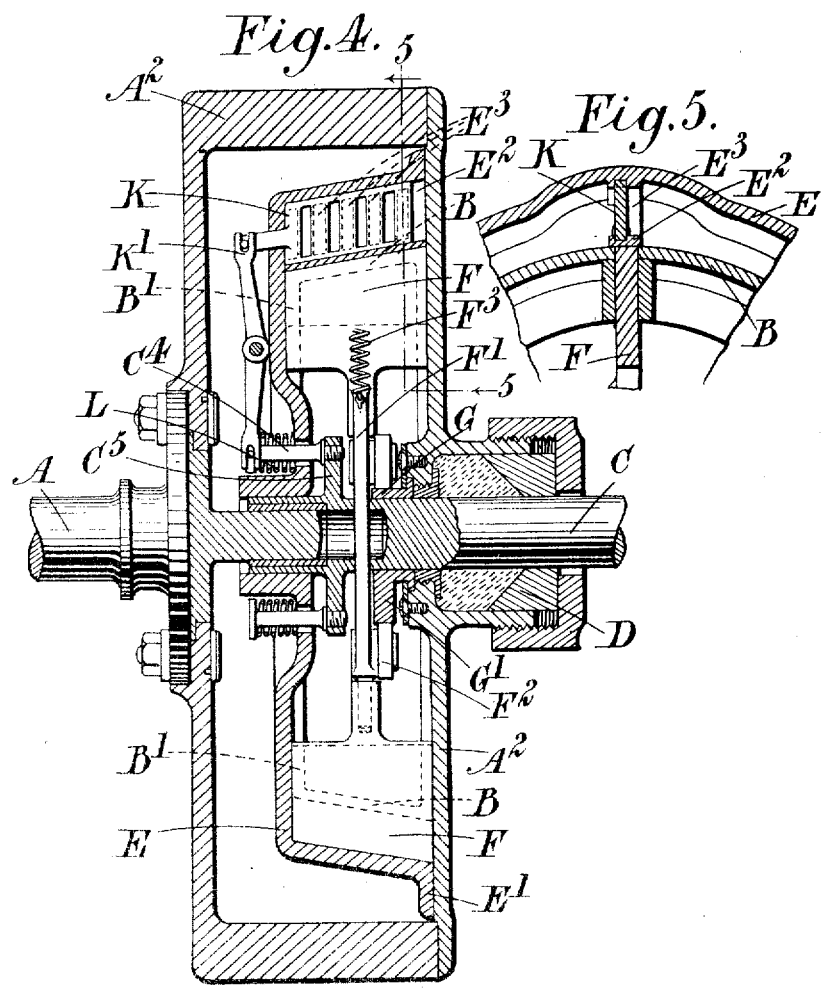

No. 829,549. PATENTED AUG. 28, 1906.
G. SPARKS.
HYDRAULIC CLUTCH.
APPLICATION FILED JAN. 3, 1906.
6 SHEETS—SHEET 4.
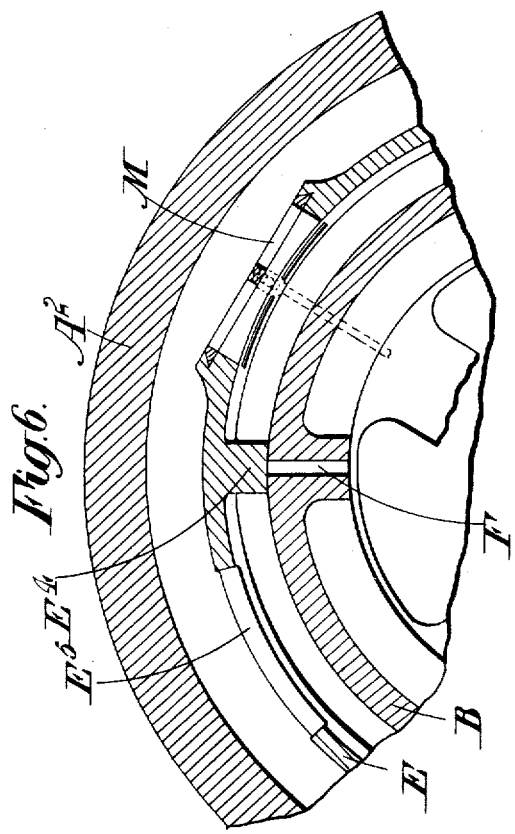
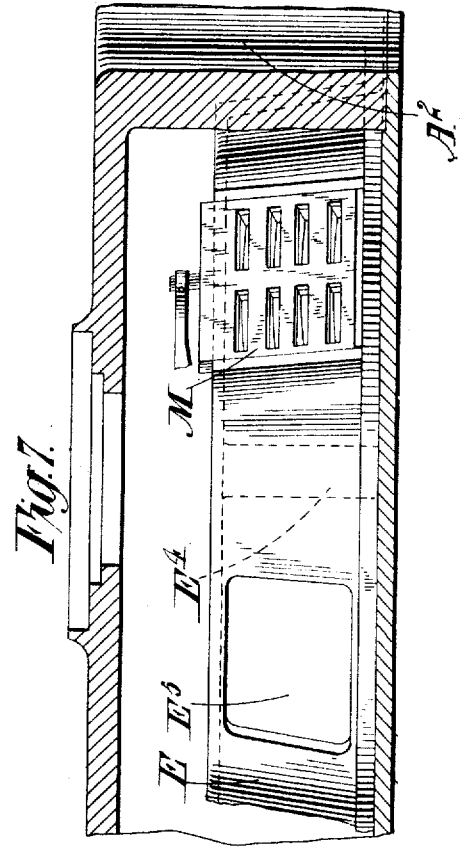

No. 829,549. PATENTED AUG. 28, 1906.
G. SPARKS.
HYDRAULIC CLUTCH.
APPLICATION FILED JAN. 3, 1906.
6 SHEETS—SHEET 5.
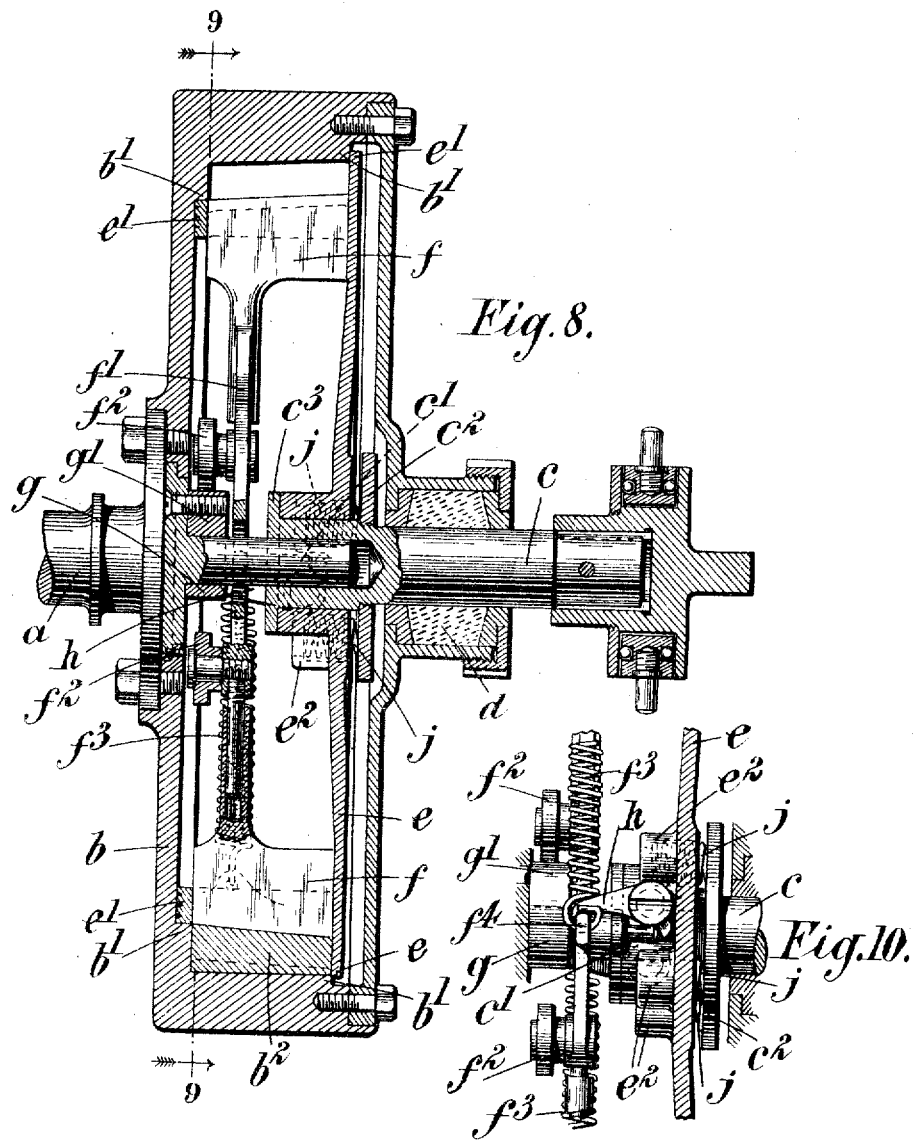

UNITED STATES PATENT OFFICE.

GEORGE SPARKS, OF FELTHAM, ENGLAND, ASSIGNOR TO SPARKS-BOOTHBY HYDRAULIC CLUTCH, LIMITED, OF LONDON, ENGLAND.

HYDRAULIC CLUTCH.

No. 829,549.  Specification of Letters Patent.  Patented Aug. 28, 1906.

Application filed January 3, 1906. Serial No. 294,470.

*To all whom it may concern:*

Be it known that I, GEORGE SPARKS, a subject of the King of England, residing at Feltham, in the county of Middlesex, England, have invented a certain new and useful Hydraulic Clutch, of which the following is a specification.

This invention relates to improvements in hydraulic clutches, the object being to provide a clutch suitable for bringing machinery into motion gradually.

According to this invention the hydraulic clutch comprises a casing filled with liquid and forming one clutch member, another member in the casing and forming therewith an annular chamber when the members are engaged, projections on the members fitting into and dividing the chamber, and means for relatively moving the members axially into and out of engagement.

An important feature of this invention consists in utilizing the pressure generated in the fluid locked between the members to hold the inner member in position, and for this purpose a conduit may be led from the annular chamber into the casing to cause the pressure in the liquid between the members to press the members into engagement.

According to this invention a valve may be employed to permit a regulated leak of liquid in the annular chamber and to allow the clutch to slip.

Means are provided for shifting the valve and for moving the members into and out of engagement in such a way that the valve is opened before the clutch is disengaged and closed after the clutch is engaged.

Figures 1, 3:
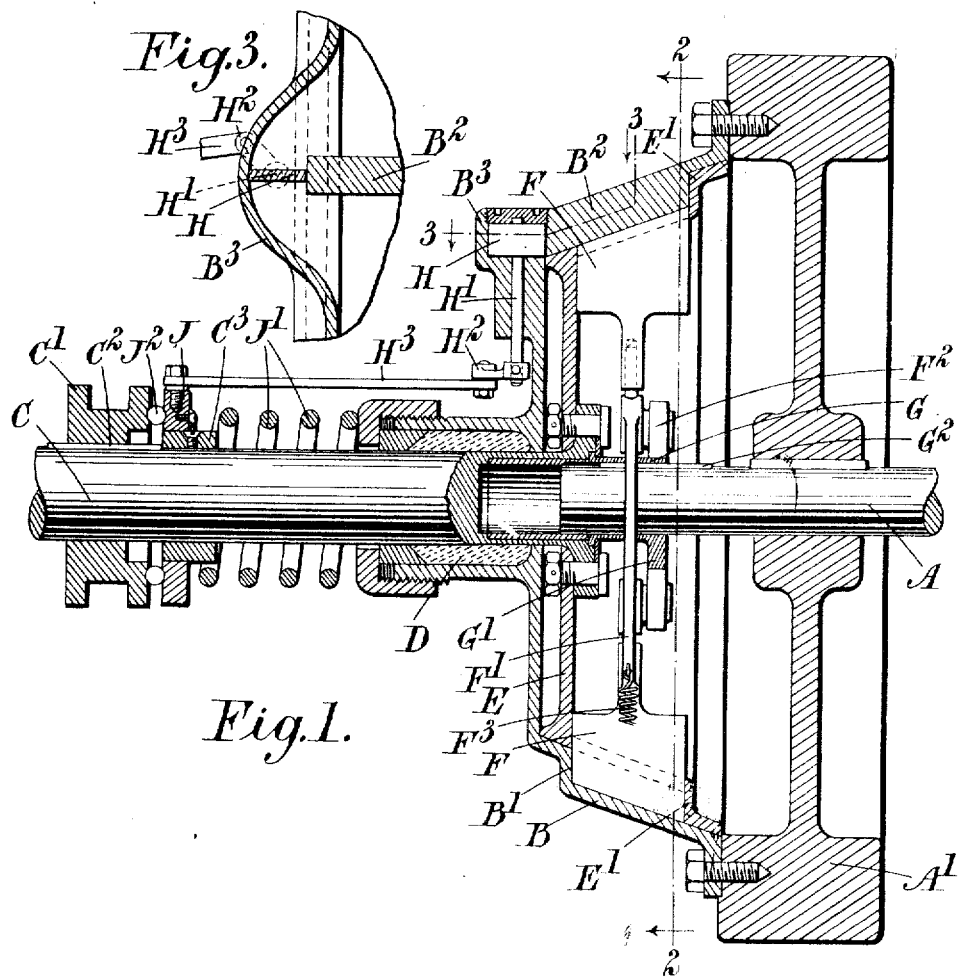
Figure 9:
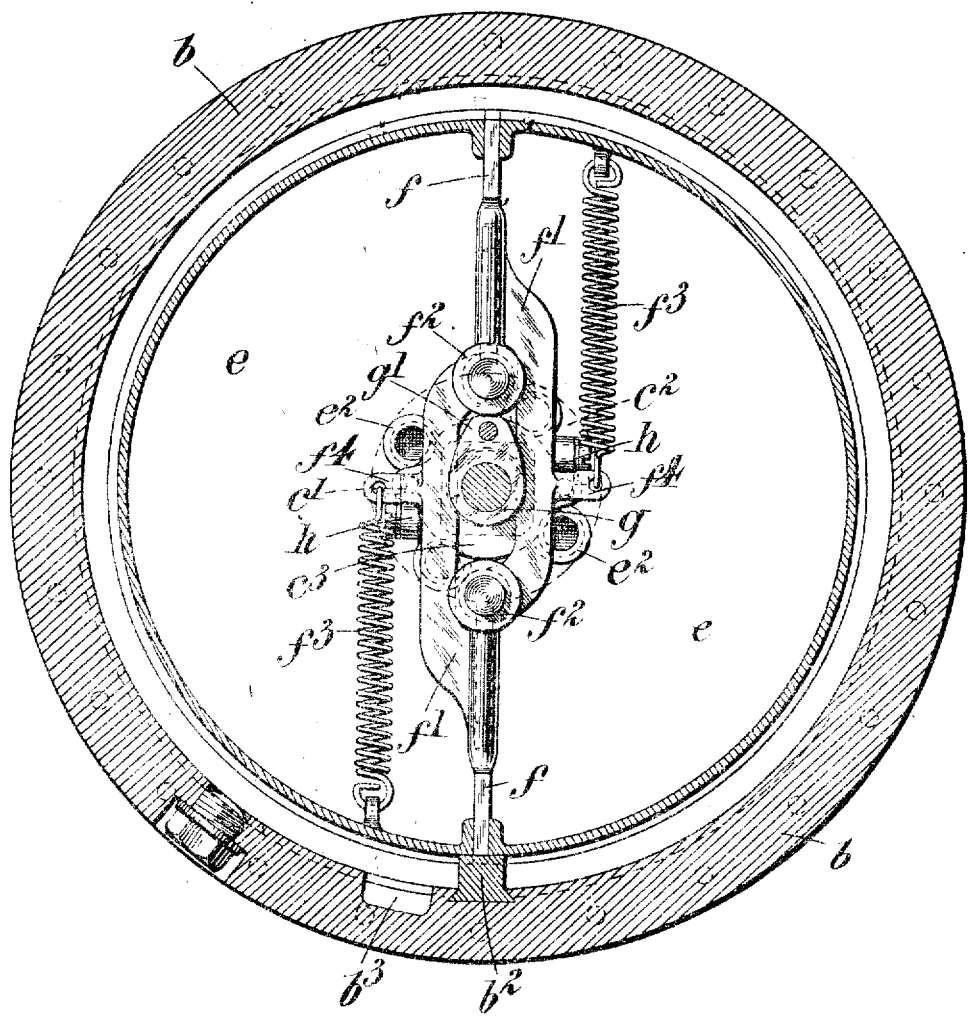

In the accompanying drawings, Figure 1 is a central transverse section of one form of clutch embodying this invention and particularly applicable to a motor-vehicle. Fig. 2 is a section on the line 2 2 of Fig. 1. Fig. 3 is a sectional plan of a detail on the line 3 3 of Fig. 1. Fig. 4 is a central transverse section of a modified form of clutch. Fig. 5 is a part section on the line 5 5 of Fig. 4. Fig. 6 is a similar section to Fig. 5, showing a modified arrangement of the fixed projection, conduit, and valve, and Fig. 7 is a plan of the arrangement shown in Fig. 6. Fig. 8 is a central transverse section of a modified form of clutch. Fig. 9 is a sectional elevation on the line 9 9 of Fig. 8; and Fig. 10 is a side elevation, partly in section, of a portion of the same mechanism.

Like letters indicate like parts throughout the drawings.

Referring to Figs. 1, 2, and 3, the driving-shaft A carries an outer clutch member B in the form of a casing which is attached to the fly-wheel A', and the casing embraces the driven shaft C, a stuffing-box D being provided between the casing B and the driven shaft C to allow rotation, while retaining within the casing a liquid, such as oil, with which it is completely filled. Mounted on the driven shaft C within the outer member B is an inner sliding member E, which may be moved into or out of contact with the outer member B by any suitable device, such as the usual clutch-pedal. By means of flanges or steps B' and E' on the members a closed annular chamber is formed between the members when they are engaged. On the casing B is fixed a projection $B^2$, which forms a partition in the annular chamber. The inner member E is provided with two radial vanes F, which when driving coöperate with the fixed projection $B^2$ to lock the liquid in the annular chamber. Springs $F^3$ exert an outward pull on the vanes.

In order that during the relative motion of the clutch members the sliding vanes F may be momentarily withdrawn to clear the fixed projection $B^2$, the vanes are controlled by a cam-gear. A cam G with a projection G' on one side is mounted on the driving-shaft A, and the spindle F' of each vane terminates in a hook carrying a roller $F^2$, which engages the cam G at a point diametrically opposite to the corresponding vane F, so that as the cam rotates it withdraws the vane F from the annular chamber, so as to clear the fixed projection $B^2$. With such a construction one cam would serve to operate two vanes; but any other similar gear may be employed. As the inner member E slides it carries the vanes F with it, and as it is essential to continue the operation of withdrawing the vanes the cam G and the rollers $F^2$ are arranged accordingly. In the arrangement illustrated the cam G slides upon a feather $G^2$ on the driving-shaft and may be shifted along with the driven shaft C to keep the cam G and the rollers $F^2$ in the same relative position. Any other suitable arrangement may be used—for example, a long cam may be fixed on the driving-shaft.

To vary the leakage of fluid in the annular chamber and to allow the clutch to slip, a small extension B³ of the annular chamber is formed in the casing B and a valve H is disposed therein and carried on a spindle H', which is attached at its lower end to a short arm H². The arm H² can be turned to open and close the valve by means of a rod H³, pivoted to the arm H² and to a sliding collar J, which is held between a spring J' and a sleeve C', which slides on a feather C² on the driven shaft C, a ball-bearing J² being disposed between the collar and the sleeve. A shoulder or abutment C³ is attached to the driven shaft, and the sleeve can be shifted backward and forward by means of the usual clutch-pedal or other mechanism, the arrangement being such that when the sleeve C' slides toward the right—i. e., to release the clutch—the valve H is opened before the sleeve C' meets the abutment C³, while when the sleeve C' is moved to the left to put the clutch in the valve H is closed after the inner member E is in contact with the outer member B.

In order to utilize the pressure generated in the fluid locked between the members to hold the inner clutch member E in position, the pressure in the annular chamber is caused to take effect upon the back of the inner member. For this purpose the casing B is completely filled with liquid and a conduit may be led from the annular chamber to the space in the casing B behind the inner member E. In the arrangement illustrated in Figs. 1, 2, and 3 no separate conduit is shown, and such separate conduit is not always essential, as when the clutch commences to drive the leakage between the inner member and the outer member B is sufficient to enable the pressure in the annular chamber to be communicated to the space behind the inner member.

As the outer casing is completely filled with oil and as the area of pressure on the back of the inner member is greater than the area of pressure on the other side, the two members are pressed together, whereby an efficient engagement of the clutch is insured. By this means liquid-tight joints are obtained and in some cases it may be that effective frictional engagement of the clutch also results.

The operation of the clutch is as follows: When running free, the inner member E is entirely clear of the outer member B and the vanes F and projection B² make no oil-tight joints, but rotate freely relatively to one another. When the inner member E is allowed to come into contact with the outer member B, the valve H may still be kept open; but when the valve H is closed pressure is immediately set up in the annular chamber between the projection B² and the vane F, to which it is approaching, and this pressure is communicated to the back of the inner clutch member, whereby an effective engagement of the clutch is insured. To relieve the clutch or to allow it to slip, the valve H may be opened.

Referring now to Figs. 4 and 5, the driving-shaft A carries an outer casing and fly-wheel A², to which is attached one clutch member B. The casing embraces the driven shaft C, a stuffing-box D'being provided between the casing and the driven shaft to allow rotation, while retaining within the casing the liquid, such as oil, with which it is completely filled.

Mounted on the driven shaft C within the casing A is an inner sliding member E, which may be moved into or out of contact with the outer member by any suitable device, such as the usual clutch-pedal. By means of flanges or steps B' and E' on the members a closed annular chamber is formed between them when they are engaged.

On one member—in this case the inner member—is a fixed projection E², which forms a partition in the annular chamber. In this form the projection E² has a number of slots E³, which coöperate with a slotted sliding plate K to form a valve which is used to vary the leakage of fluid in the annular chamber and to allow the clutch to slip. The plate K is pivotally connected to one end of a lever K', the other end of which is pivotally connected to the head of a stud C⁴, secured to the driven shaft C by a flange C⁵. Springs L are placed on the studs C⁴ between the heads and the inner member E, the arrangement being such that when the driven shaft C is shifted to release the clutch the plate K is caused to open the valve before the inner member E is moved away from the other member B, while when the driven shaft C is shifted to apply the clutch the plate K is caused to close the valve after the inner member is brought into contact with the other member.

The form of the vanes F and the cam G is the same as in the construction previously described; but in this construction the vanes and the cam do not move with the sliding member.

As before, when the clutch is applied and the plate K is shifted to close the valve the pressure generated in the annular chamber is communicated to the back of the inner member, and as the area over which the pressure takes effect on the back of the inner member is greater than that over which it takes effect on the other side of the inner member an efficient engagement of the clutch is insured. To allow the clutch to slip or to release it, the driven shaft C is shifted to open the valve.

Referring to Figs. 6 and 7, the arrangement of the clutch members is the same as that shown in Fig. 4, but the disposition of the valve is different. A fixed projection E⁴ is formed on the clutch member E, and a hole $E^5$ is formed in the member E to connect the annular chamber with the space in the casing behind the sliding member E. In arranging the conduit between the annular chamber and the space in the casing behind the sliding member it is necessary to insure that the conduit leave the chamber at a point at which there will constantly be a high pressure when driving. In the construction illustrated in Figs. 6 and 7 the hole $E^5$ leads from the annular chamber at that side of the projection $E^4$ at which pressure takes place.

Instead of arranging a valve in the fixed projection the valve M in this case is disposed in the wall of the sliding member E at the opposite side of the fixed projection $E^4$ from the hole $E^5$. The casing is, as before, completely filled with oil, and when the valev M is opened the liquid leaks out of the chamber through the hole $E^5$ on the one side of the projection $E^4$ and is admitted to the annular chamber on the other side of the projection through the adjustable valve M. The operation of the valve M is in other respects identical with that of the valve K, as shown in Fig. 4 and described above.

Referring to Figs. 8, 9, and 10, the driving-shaft $a$ carries an outer clutch member $b$ in the form of a casing which conveniently forms the fly-wheel. The casing embraces the driven shaft, and a stuffing-box $d$ is provided between the casing $b$ and the driven shaft $c$ to allow rotation, while retaining within the casing the liquid, such as oil, with which it is to be completely filled.

Loosely mounted on the driven shaft $c$ within the outer member $b$ is an inner sliding member $e$, which may be moved into or out of contact with the outer member $b$ by any suitable device, such as the usual clutch-pedal. By means of flanges or steps $b'$ on the outer member and flanges or steps $e'$ on the inner member a closed annular chamber is formed between the members when they are engaged. On the outer member $b$ is a fixed projection $b^2$, which forms a partition in the annular chamber. The inner member $e$ is provided with two radial vanes $f$, which when driving coöperate with the fixed projection $b^2$ to lock the liquid in the annular chamber.

In order that during relative motion of the clutch members the sliding vanes $f$ may be momentarily withdrawn to clear the fixed projection $b^2$, the vanes are controlled by a cam $g$, a projection $g'$ on one side mounted on the casing $b$, and a spindle $f'$ on each vane terminating in a hook carrying a roller $f^2$, which engages the cam $g$ at a point diametrically opposite to the corresponding vane $f$, so that as the cam rotates it withdraws the vane $f$ from the annular chamber so as to clear the fixed projection $b^2$. Springs $f^3$ exert an outward pull on the vanes.

In order to remove the vanes $f$ permanently from the annular chamber to a greater or less extent, (when it is desired to vary the leakage of fluid in the annular chamber and to allow the clutch to slip,) a device is employed operated by the sliding shaft $c$ and acting directly on the vanes. In the arrangement shown a bell-crank lever $h$, pivoted to the clutch member $e$, is arranged to engage at one end with a projection $f^4$ on one vane, and a projection $c'$ on the sliding shaft $c$ is arranged to engage the other end of the bell-crank lever when the sliding shaft is moved outward. As shown, one of these bell-crank levers may be employed for each vane, so that the vanes may be held out of the annular chamber to any desired extent.

As the projection $c'$ is moved upward it engages the bell-crank lever and pulls the corresponding vane out of the annular chamber. As the projection $c'$ is moved inward it releases the bell-crank lever and the vane is then free.

In order that the sliding shaft may operate on the vanes, as described, during one portion of its travel and may operate during the remainder of its travel to shift the inner member of the clutch bodily into or out of position, springs $j$ are interposed between a flange $c^2$ or the like on the sliding shaft $c$ and some portion of the inner member of the clutch—in the example illustrated in the pockets $e^2$. The sliding shaft has a flange $c^3$ on its inner end arranged to engage the inner clutch member $e$, so that the sliding shaft has a certain amount of play, during which the vanes can be operated by the bell-crank levers before the flange $c^3$ on the sliding shaft engages the inner member of the clutch. By this arrangement when the clutch is engaged and the sliding shaft $c$ is moved so as to disengage the clutch the vanes will first be removed from the annular chamber by the bell-crank levers, so as to allow the clutch to slip, and thereafter the inner member of the clutch will be shifted out of contact with the outer member. When the clutch is allowed to come into engagement again, the inner member will come into contact with the outer member before the vanes reënter the annular chamber, and the vanes may be operated without shifting the inner member by moving the sliding shaft within the limits of its play.

In order that the pressure generated in the fluid locked between the members may be utilized to hold the inner clutch member in position, the inner clutch member may consist of a disk or plate $e$, with the necessary projections thereon, and a conduit or port $b^3$ may be led from the annular chamber to the back of the inner clutch member.

The pockets $c^2$, in which the springs $j$ are disposed, may be open at each end, and if it is desired to close these apertures when the clutch is engaged a plate or flange on the sliding shaft may be arranged to cover the slots when the sliding shaft is pushed inward, (to engage the clutch.) As shown, this plate on the sliding shaft constitutes the abutment $c^3$ for the ends of the springs.

In place of a bell-crank lever to operate the vanes any other similar device may be employed—such, for example, as a simple lever pivoted at one end, arranged to engage the projection on a vane at the other end and operated upon by a flange or projection on the sliding shaft, so as to move the vanes, or a tapered cam may be mounted on the sliding shaft, so as to determine the position of the vanes. This cam may conveniently take the form described in the specification and illustrated in Figs. 1, 4, and 5 of the drawings of the previous United States Patent No. 799,102.

It is to be understood that the details of construction may be varied without departing from this invention.

What I claim as my invention, and desire to secure by Letters Patent, is:—

1. In a hydraulic clutch the combination of a casing filled with liquid and forming one clutch member, another member in the casing and forming therewith an annular chamber when the members are engaged, projections on the members fitting into and dividing the chamber and means for relatively moving the members axially into and out of engagement.

2. In a hydraulic clutch the combination of a casing filled with liquid and forming one clutch member, another member in the casing and forming therewith an annular chamber when the members are engaged, projections on the members fitting into and dividing the chamber, means for relatively moving the members axially into and out of engagement and means to cause the pressure in the chamber to press the members into engagement.

3. In a hydraulic clutch the combination of a casing filled with liquid and forming one clutch member, another member in the casing and forming therewith an annular chamber when the members are engaged, projections on the members fitting into and dividing the chamber, means for relatively moving the members axially into and out of engagement and a conduit from the chamber into the casing to cause the pressure in the liquid between the members to press the members into engagement.

4. In a hydraulic clutch the combination of a casing filled with liquid and forming a driving clutch member, a driven clutch member in the casing and forming with the driving member an annular chamber when the members are engaged, projections on the members between which the liquid may be locked, means for automatically displacing certain of the projections to clear one another, means for displacing said projections at will to allow relative rotation of the members, means for relatively moving the members axially into and out of engagement and means to cause the pressure in the chamber to press the members into engagement.

5. In a hydraulic clutch the combination of a casing filled with liquid and forming a driving clutch member, a driven clutch member in the casing and forming with the driving member an annular chamber when the members are engaged, projections on the members between which the liquid may be locked, a conduit from the chamber into the casing to cause the pressure in the liquid between the members to press the members into engagement, a valve for permitting a regulated leak of liquid in the annular chamber and means for relatively moving the members axially into and out of engagement.

6. In a hydraulic clutch the combination of a casing filled with liquid and forming a driving clutch member, a driven clutch member in the casing and forming with the driving member an annular chamber when the members are engaged, projections on the members between which the liquid may be locked, a conduit from the chamber into the casing to cause the pressure of the liquid between the members to press the members into engagement, a valve for permitting a regulated leak of liquid in the annular chamber and means for shifting the valve and for moving the members into and out of engagement, whereby the valve is opened before the clutch is disengaged and closed after the clutch is engaged.

7. In a hydraulic clutch the combination of a driving-shaft, a casing thereon filled with oil, a driven shaft projecting into the casing and movable axially therein, a driving clutch member on the casing, a driven clutch member on the driven shaft in the casing and forming with the driving clutch member an annular chamber when the members are engaged, projections on the members between which the oil may be locked, means for automatically displacing certain of the projections to clear one another and means for shifting the driven member into and out of engagement with the driving member.

8. In a hydraulic clutch the combination of a driving-shaft, a casing thereon filled with oil, a driven shaft, projecting into the casing and movable axially therein, a conical driving clutch member on the casing, a conical driven clutch member on the driven shaft in the casing and forming with the driving clutch member a conical annular chamber when the members are engaged, projections on the members between which the oil may be locked, means for automatically displacing certain of the projections to clear one another and means for shifting the driven member into and out of engagement with the driving member.

9. In a hydraulic clutch the combination of a driving-shaft, a casing thereon filled with oil, a driven shaft projecting into the casing and movable axially therein, a conical driving clutch member on the casing, a conical driven clutch member on the driven shaft in the casing and forming with the driving clutch member a conical annular chamber when the members are engaged, projections on the member between which the oil may be locked, means for automatically displacing certain of the projections to clear one another, a conduit from the annular chamber into the casing to cause the pressure in the liquid between the members to press the members into engagement, and means for shifting the driven member into and out of engagement with the driving member.

10. In a hydraulic clutch the combination of a driving-shaft, a casing thereon filled with oil, a driven shaft projecting into the casing and movable axially therein, a driving clutch member on the casing, a driven clutch member on the driven shaft in the casing and forming with the driving clutch member an annular chamber when the members are engaged, a fixed projection on one member fitting into and dividing the chamber, a plurality of sliding radial vanes carried by the other clutch member and normally projecting into and dividing the chamber, means for automatically displacing the vanes to clear the fixed projection, means for displacing the vanes at will to allow relative rotation of the members, and means for shifting the driven member into and out of engagement with the driving member.

11. In a hydraulic clutch the combination of a driving-shaft, a casing thereon filled with oil, a conical inner clutch member on the inside of the casing, a driven shaft projecting into the casing and movable axially therein, an outer conical clutch member loosely mounted on the driven shaft and forming with the inner member when engaged, a conical annular chamber, a fixed projection on the outer chamber fitting into and dividing the chamber, a plurality of radial vanes carried by the inner clutch member and arranged to project into and divide the chamber or to be removed therefrom, rollers attached to the vanes, a cam on the driven shaft engaging the rollers and arranged to withdraw the vanes to clear the fixed projection during rotation, a conduit from the annular chamber into the casing at the pressure side of the fixed projection, and means for shifting the driven member into and out of engagement with the driving member.

12. In a hydraulic clutch the combination of a driving-shaft, a casing thereon filled with oil, a conical inner clutch member on the inside of the casing, a driven shaft projecting into the casing and movable axially therein, an outer conical clutch member loosely mounted on the driven shaft and forming with the inner member, when engaged, a conical annular chamber, a fixed projection on the outer member fitting into and dividing the chamber a plurality of radial vanes carried by the inner clutch member and arranged to project into and divide the chamber or to be removed therefrom, rollers attached to the vanes, a cam on the driven shaft engaging the rollers and arranged to withdraw the vanes to clear the fixed projection during rotation, a conduit from the annular chamber into the casing at the pressure side of the fixed projection, an adjustable valve to control the leak of oil into the chamber on the other side of the projection and means for shifting the driven member into and out of engagement with the driving member.

13. In a hydraulic clutch the combination of a driving-shaft, a casing thereon filled with oil, a conical inner clutch member on the inside of the casing, a driven shaft projecting into the casing and movable axially therein, an outer conical clutch member loosely mounted on the driven shaft and forming with the inner member, when engaged, a conical annular chamber, a fixed projection on the outer member fitting into and dividing the chamber, a plurality of radial vanes carried by the inner clutch member and arranged to project into and divide the chamber or to be removed therefrom, rollers attached to the vanes, a cam on the driven shaft engaging the rollers and arranged to withdraw the vanes to clear the fixed projection, during rotation, a conduit from the annular chamber into the casing at the pressure side of the fixed projection, an adjustable valve to control the leak of oil into the chamber on the other side of the projection, a spring-controlled lever pivoted to the outer clutch member and connecting the valve to the driven shaft and means for shifting the driven shaft whereby the valve is opened before the clutch is disengaged and closed after the clutch is engaged.

In testimony whereof I have signed my name to this specification in presence of two subscribing witnesses.

GEORGE SPARKS.

Witnesses:
H. D. JAMESON,
A. NUTTING.